United States Patent
Sawada et al.

(10) Patent No.: US 12,393,411 B2
(45) Date of Patent: Aug. 19, 2025

(54) DATA ANALYSIS APPARATUS AND DATA ANALYSIS METHOD

(71) Applicant: SHIMADZU CORPORATION, Kyoto (JP)

(72) Inventors: Ryuji Sawada, Kyoto (JP); Takeshi Ono, Kyoto (JP); Shuhei Yamamoto, Kyoto (JP); Hiroaki Tsushima, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 162 days.

(21) Appl. No.: 17/972,848

(22) Filed: Oct. 25, 2022

(65) Prior Publication Data

US 2023/0143489 A1  May 11, 2023

(30) Foreign Application Priority Data

Nov. 5, 2021 (JP) .................................. 2021-181114

(51) Int. Cl.
 *G06F 9/44* (2018.01)
 *G06F 8/41* (2018.01)
 *G06N 20/00* (2019.01)

(52) U.S. Cl.
 CPC .............. *G06F 8/45* (2013.01); *G06N 20/00* (2019.01)

(58) Field of Classification Search
 None
 See application file for complete search history.

(56) References Cited

U.S. PATENT DOCUMENTS

| | | | |
|---|---|---|---|
| 7,853,937 B2* | 12/2010 | Janczewski | G06F 8/45 717/149 |
| 10,776,911 B2* | 9/2020 | Tamai | G06N 3/08 |
| 11,593,684 B2* | 2/2023 | Kapur | G06N 5/04 |
| 2004/0172223 A1* | 9/2004 | Lindeman | G06F 30/00 703/1 |
| 2021/0019499 A1 | 1/2021 | Takahashi | |
| 2021/0049411 A1* | 2/2021 | Tanji | G06N 3/02 |
| 2021/0164883 A1 | 6/2021 | Imakubo et al. | |
| 2022/0171982 A1* | 6/2022 | Gosinski | G06Q 10/20 |
| 2022/0358749 A1* | 11/2022 | Yonetani | G06N 3/08 |
| 2023/0094742 A1* | 3/2023 | Geist | G06N 20/20 706/12 |

FOREIGN PATENT DOCUMENTS

| | | |
|---|---|---|
| EP | 3 450 956 A1 | 3/2019 |
| JP | 2021-83431 A | 6/2021 |
| WO | 2017/195785 A1 | 11/2017 |
| WO | 2019/180848 A1 | 9/2019 |

OTHER PUBLICATIONS

Office Action issued May 27, 2025 in Japanese Application No. 2021-181114.

* cited by examiner

*Primary Examiner* — Qamrun Nahar
(74) *Attorney, Agent, or Firm* — Sughrue Mion, PLLC

(57) ABSTRACT

A data analysis apparatus includes a control unit that performs control of receiving an operation to select analysis data, control of receiving an operation to select a plurality of scripts that execute analysis on the selected analysis data, and control of executing analysis on the selected analysis data by the plurality of selected scripts in parallel. The data analysis apparatus also includes a display unit configured to display analysis results of the analysis data by the control unit on the same screen.

10 Claims, 7 Drawing Sheets

ANALYSIS RECIPE

ANALYSIS RECIPE

DATA ANALYSIS APPARATUS AND DATA ANALYSIS METHOD

CROSS-REFERENCE TO RELATED APPLICATIONS

The priority application number JP2021-181114, a data analysis apparatus and a data analysis method, Nov. 5, 2021, SAWADA Ryuji, ONO Takeshi, YAMAMOTO Shuhei, TSUSHIMA, Hiroaki, upon which this patent application is based are hereby incorporated by reference.

BACKGROUND OF THE INVENTION

Field of the Invention

The present invention relates to a data analysis apparatus and a data analysis method.

Background Art

Conventionally, a data analysis apparatus and a data analysis method that analyzes image data using a script are known. Such a data analysis apparatus and a data analysis method are disclosed, for example, in PCT International Publication No. WO2019/180848.

PCT International Publication No. WO2019/180848 discloses a cell image analysis apparatus (data analysis apparatus) for analyzing cell images. Here, a cell image may include a removal target to be removed such as impurities. The cell image analysis apparatus described in PCT International Publication No. WO2019/180848 generates a label image representing a location of a removal target region in the cell image. Then, a set of cell images and label images is used as a data set for machine learning. A plurality of learning models (scripts) for identifying a predetermined removal target generated by the machine learning are registered in the cell image analysis apparatus. Then, processing of one learning model selected by a user from among the plurality of registered learning models is executed.

However, in PCT International Publication No. WO2019/180848, as described above, processing of one learning model (script) selected by the user from among the plurality of registered learning models is executed. In this case, when it is desired to acquire respective analysis results of the plurality of learning models, it is necessary to individually execute processing for each of the plurality of learning models. For this reason, it is considered that the labor of the user increases by the number of learning models (scripts) to be executed. Therefore, there is a demand for a data analysis apparatus and a data analysis method that can reduce the labor of the user when executing a plurality of scripts in parallel.

SUMMARY OF THE INVENTION

The present invention has been made to solve the above problems, and one object of the present invention is to provide a data analysis apparatus and a data analysis method capable of reducing the labor of the user when executing a plurality of scripts.

In order to achieve the above object, a first aspect of the present invention relates to a data analysis apparatus including a control unit configured to perform control of receiving an operation to select analysis data acquired by an analysis device, control of receiving an operation to select a plurality of scripts that perform analysis on the selected analysis data, and control of executing analysis on the selected analysis data by the plurality of selected scripts in parallel and a display unit configured to display analysis results acquired by analyzing the analysis data by the control unit on the same screen. The script means a simple program executable by a computer. Also, "executing analysis in parallel" means "executing analysis at the same time".

A second aspect of the present invention relates to a data analysis method including a step of receiving a selection of analysis data acquired by an analysis device, a step of selecting a plurality of scripts that execute analysis on the analysis data, and a step of executing analysis on the selected analysis data by the plurality of selected scripts in parallel.

In the data analysis apparatus of the first aspect, as described above, control is performed to execute analysis on the selected analysis data by the plurality of selected scripts in parallel. As a result, since it is not necessary to individually execute the work of processing for each of the plurality of scripts on one piece of data, it is possible to reduce the labor of the user. Therefore, it is possible to reduce the labor of the user when executing the plurality of scripts. In addition, the work time can be shortened compared to the case of performing the work of individually executing processing for each of the plurality of scripts. Further, the same effect can also be obtained in the data analysis method in the second aspect, which includes a step of executing analysis on the selected analysis data by the plurality of selected scripts in parallel.

DETAILED DESCRIPTION OF THE INVENTION

Figure 1:
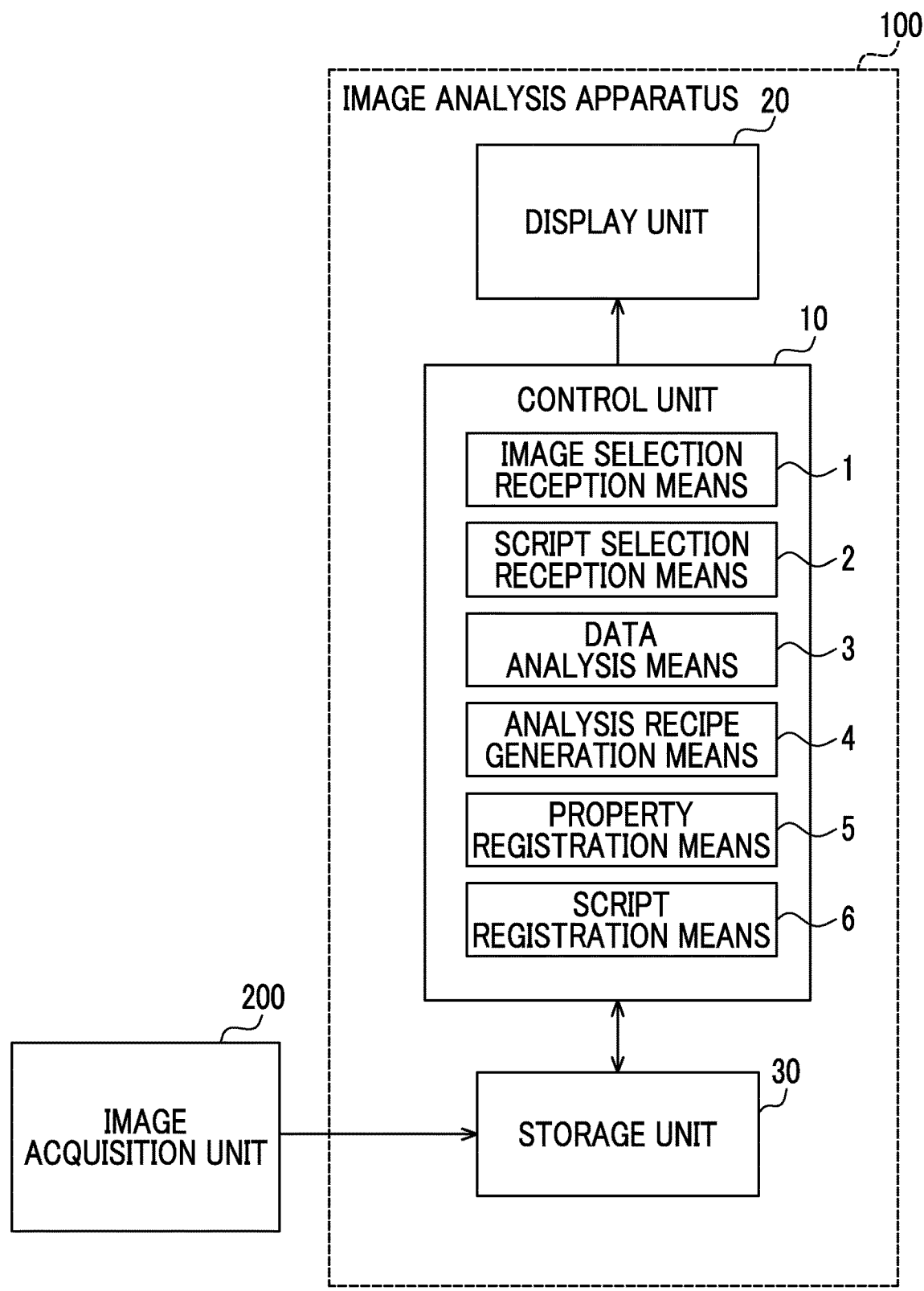
FIG. 1 is a diagram showing a configuration of an image analysis apparatus according to an embodiment.

Hereinafter, embodiments embodying the present invention will be described with reference to the drawings.

A configuration of an image analysis apparatus 100 according to the present embodiment will be described with reference to FIGS. 1 to 6. The image analysis apparatus 100 is an example of a "data analysis apparatus" in the claims.

Configuration of Image Analysis Apparatus

The image analysis apparatus 100 includes a control unit 10 and a display unit 20. Further, the image analysis apparatus 100 is provided with a storage unit 30 in which image data and the like acquired by an external image acquisition unit 200 is stored. The storage unit 30 is configured by, for example, a hard disk, a flash memory or the like. The display unit 20 displays analysis results acquired by data analysis by the control unit 10. The image data and the like acquired by the image acquisition unit 200 may be stored in an external device of the image analysis apparatus 100, or may be stored in a storage region (for example, a cache memory) of the image analysis apparatus 100 different from the storage unit 30. Further, the image analysis apparatus 100 itself may be provided with a mechanism for acquiring image data for analysis. In addition, the image acquisition unit 200 is an example of an "analysis device" in the claims.

The control unit 10 is configured to function as an image selection reception means 1, a script selection reception means 2, a data analysis means 3, an analysis recipe generation means 4, a property registration means 5, and a script registration means 6. In the control unit 10, the functions of the image selection reception means 1, the script selection reception means 2, the data analysis means 3, the analysis recipe generation means 4, the property registration means 5, and the script registration means 6 can be realized by software such as a program.

Figure 2:
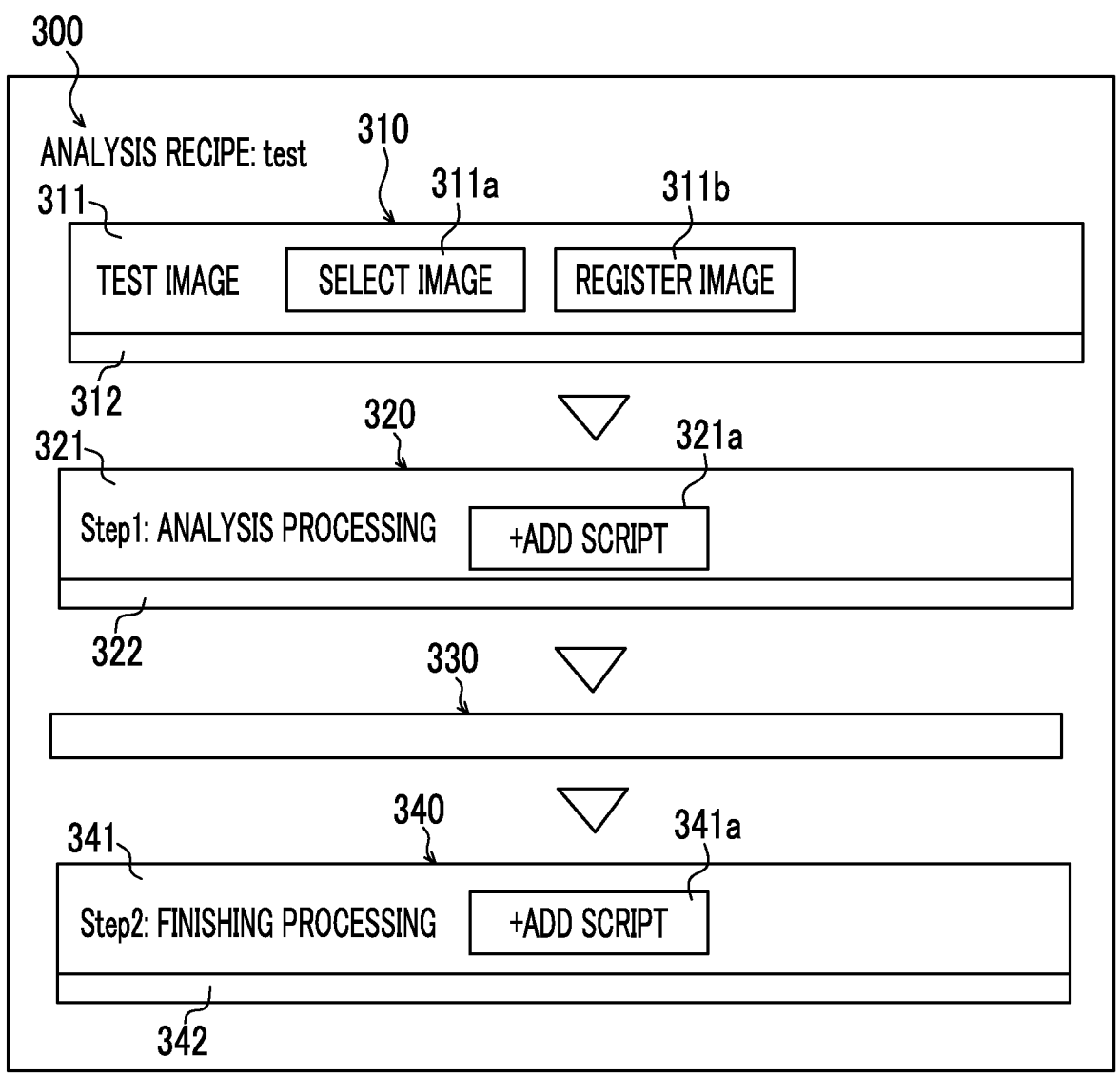
FIG. 2 is a diagram showing a setting screen of an analysis recipe according to the embodiment.

As shown in FIG. 2, the analysis recipe generation means 4 (control unit 10) performs control of generating an analysis recipe 300 in which a plurality of analysis steps for performing analysis on image data 410 are combined in series. Specifically, the analysis recipe 300 includes an analysis processing step (Step 1) in which analysis processing is performed using a trained model and an analysis algorithm, and a finishing processing step (Step 2) in which finishing processing, which will be described later, is performed. That is, the script described later includes a trained model generated by machine learning for analysis of the image data 410, an analysis algorithm used for performing analysis on the image data 410, and processing algorithms (a first processing algorithm and a second processing algorithm) used for finishing processing described later. When a trained model capable of excluding images inappropriate for analysis is selected, it is possible to perform a more appropriate analysis by the analysis algorithm. The analysis recipe 300 generated by the analysis recipe generation means 4 (control unit 10) is stored (registered) in the storage unit 30. Also, the analysis recipe 300 and the image data 410 are examples of an "analysis flow" and "analysis data" in the claims, respectively. A specific method for generating the analysis recipe 300 will be described below.

The image selection reception means 1 (control unit 10) performs control of receiving an operation to select the image data 410 to be analysis targets. Specifically, as shown in FIG. 2, on the setting screen of the analysis recipe 300, when the button 311*a* displayed as "Select image" in the upper column 311 in the "Test image" column 310 is selected, a window is displayed in which the image data 410 which are analysis targets can be selected from a plurality of image data stored in the storage unit 30. Further, when the button 311*b* displayed as "Register image" in the upper column 311 is selected, a window is displayed in which image data not stored in the storage unit 30 (for example, stored in a local PC) can be selected (registered) as image data 410 which are analysis targets. The image data 410 for which the selection has been received is displayed in the lower column 312 in the "Test image" column. In the example shown in FIG. 3, image data 410 displaying cells 400 are displayed in the lower column 312.

Further, when the button 311*b* displayed as "Image registration" is selected and the selection of the image data 410 is received, the input of the accompanying information of the image data 410 is received. Then, the selected image data 410 and the input accompanying information are associated with each other and stored (registered) in the storage unit 30. As an example of registration of the image data 410, registration of image data of cell culture well will be described. In this case, for example, it may be possible to input the passage number of cells (an operation of removing the medium from the culture system and transferring cells to a new medium) and the culture days of cells as accompanying information.

Further, the control unit 10 performs control of grouping a plurality of image data 410 by conditions, based on the accompanying information. For example, the control unit 10 performs control of dividing the plurality of image data 410 which are analysis targets into a group of data having the same passage number of cells, a group of data having the same culture days of cells, a group of data having both of the same passage number of cells and the same culture days of cells, and the like.

The script selection reception means 2 (control unit 10) performs control of receiving an operation to select the plurality of scripts that execute analysis on the selected image data 410. For example, on the setting screen of the analysis recipe 300, when the button 321*a* displayed as "+ Add script" in the upper column 321 in the "Analysis processing" column 320 is selected, a window is displayed in which scripts to be executed can be selected from the plurality of scripts stored in the storage unit 30. At this time, scripts to be executed can be selected from the trained models and analysis algorithms registered in the storage unit 30. The control unit 10 performs analysis on the image data 410 using the selected scripts. Then, analysis results of the selected scripts are displayed in the lower column 322 in the "Analysis processing" column.

Figure 3:
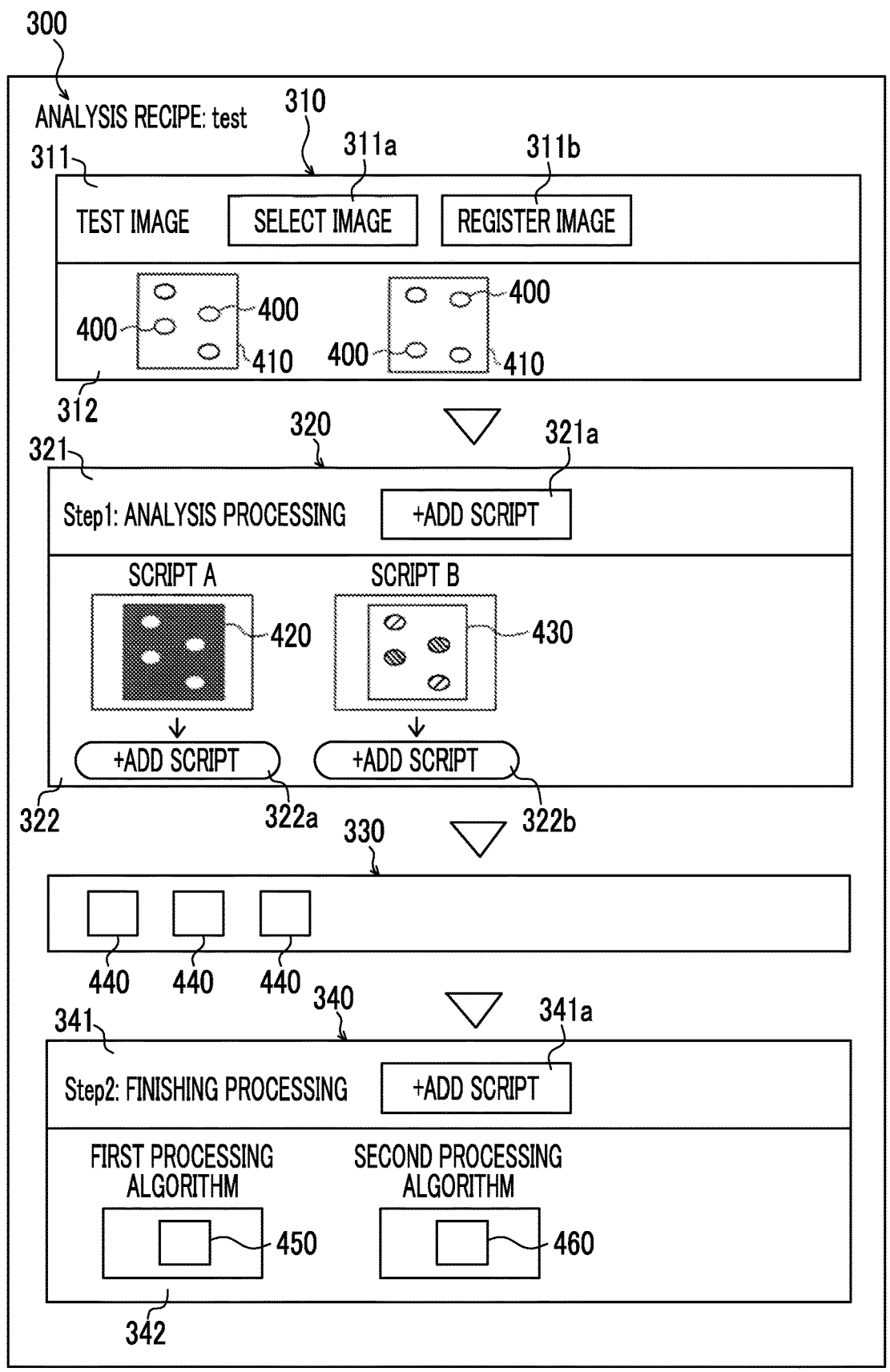
FIG. 3 is a diagram showing a screen displaying image data and scripts selected on the setting screen of the analysis recipe according to the embodiment.

Here, in the present embodiment, the script selection reception means 2 (control unit 10) performs control of executing analysis on the selected image data 410 by the plurality of selected scripts in parallel. Specifically, the script selection reception means 2 (control unit 10) is configured to perform control of executing analysis on the selected image data 410 by a plurality of selected trained models in parallel, and of executing analysis on the selected image data 410 by a plurality of selected analysis algorithms in parallel. Specifically, when script A and script B are selected in the window displayed by selecting the button 321*a*, the selection of both script A and script B is received. In this case, the data analysis means 3 (control unit 10) executes analysis using the script A and the script B in parallel. Although FIG. 3 shows an example in which two scripts (script A and script B) are selected, only one script or three or more scripts may be selected.

Figure 4A:
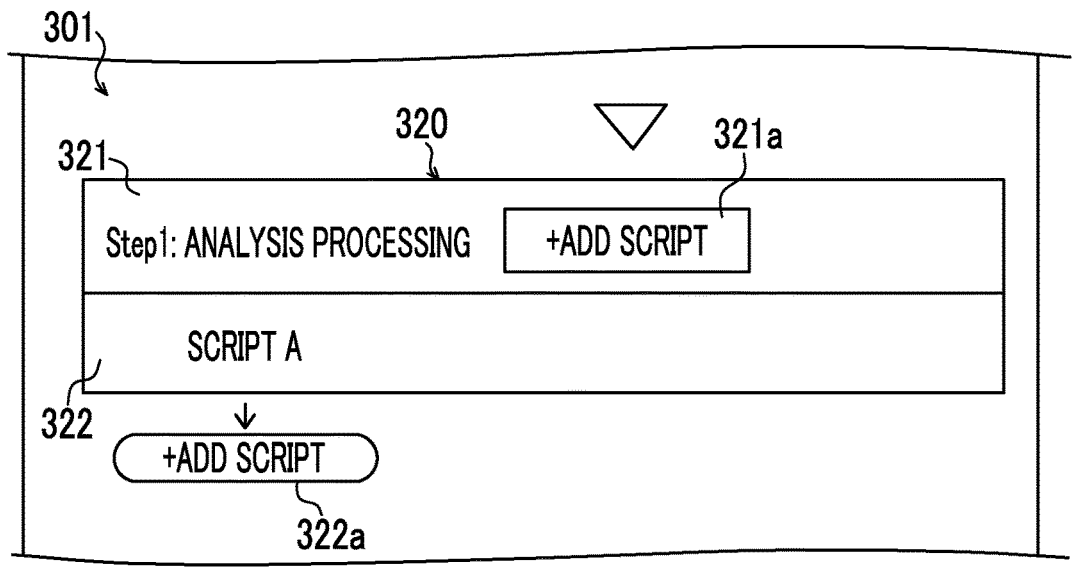
FIG. 4A is a diagram showing an example in which one script is selected in the analysis recipe.
Figure 4B:
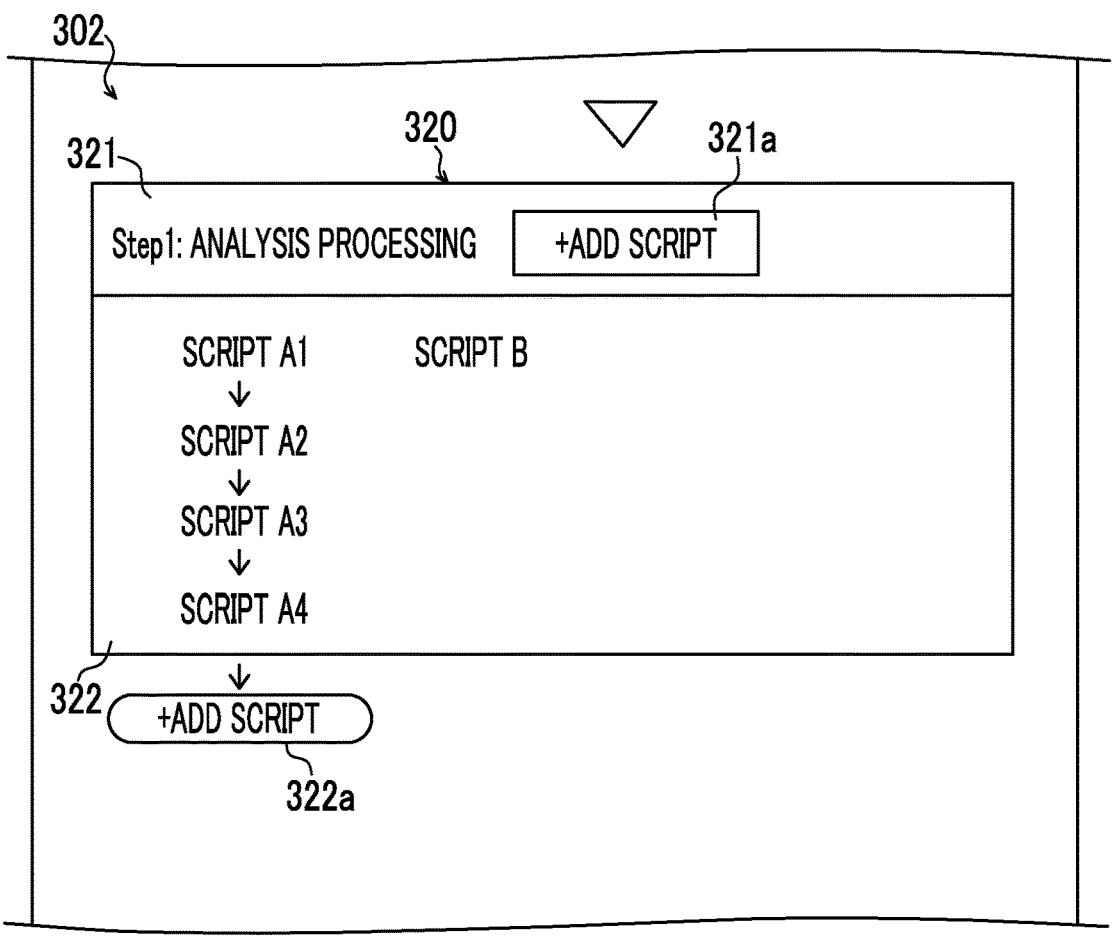
FIG. 4B is a diagram showing an example of a combination of scripts in the analysis recipe.

Specifically, in the analysis recipe 301 shown as an example in FIG. 4A, only the script A is selected. Further, in the analysis recipe 302 shown as an example in FIG. 4B, scripts A1 to A4 and script B are combined in parallel, and scripts A1 to A4 are combined in series with each other.

Further, in the present embodiment, the control unit is configured to perform control of displaying respective analysis results of the selected two or more scripts on the same screen of the display unit 20. Specifically, respective analysis results (data 420 and data 430) of script A and script B selected in the analysis processing step (Step 1) are displayed in parallel in the lower column 322 in the "Analysis processing" column. Further, the analysis results (data 450 and data 460) selected in the finishing processing step (Step 2), which will be described later, are also displayed on the same screen as the analysis results of the selected scripts in the analysis processing step. That is, all analysis results of scripts included in the analysis recipe 300 are displayed on the same screen. FIG. 3 shows, as an example of the data 420, an analysis result of a binarization processing algorithm for distinguishing cells 400 from the background. FIG. 3 also shows, as an example of the data 430, an analysis result of an analysis algorithm for color-coding the cells 400 according to the differences in the characteristics (for example, particle size, area, or the like) of the cells 400.

The control unit 10 is configured to execute another analysis algorithm which is combined in series with one analysis algorithm using the analysis result obtained by executing one analysis algorithm as input data. Specifically, by selecting the button 322a displayed as "+ Add script" in the lower column 322, one or more other scripts that are combined in series with the script A, and perform predetermined analysis using the analysis result of the script A as input data can be selected. Similarly, by selecting the button 322b displayed as "+ Add script" in the lower column 322, one or more other scripts that are combined in series with the script B, and perform predetermined analysis using the analysis result of the script B as input data can be selected.

In addition, in the present embodiment, the script selection reception means 2 (control unit 10) is configured to execute analysis on the selected image data 410 by the plurality of selected scripts in parallel in each of the plurality of analysis steps of the analysis recipe 300. That is, the script selection reception means 2 (control unit 10) performs control of receiving the selection of the plurality of scripts that can be executed in parallel not only in the analysis processing step (Step 1) but also in the finishing processing step (Step 2) described later.

Further, the script registration means 6 (control unit 10) performs control of adding (registering) scripts to the image analysis apparatus 100 based on the user's operation.

Also, the property registration means 5 (control unit 10) (refer to FIG. 1) performs control of registering properties including an input and output type, a use, and an extension to each of the scripts. Specifically, the property registration means 5 (control unit 10) performs the registration of the properties of the scripts based on the user's operation when the scripts are registered in the image analysis apparatus 100 (storage unit 30) by the script registration means 6 (control unit 10) (at the time of plug-in). The input and output type includes, for example, information about the dimensions of the input and output data of the script. The use includes, for example, information as to whether the input and output data of the script is image data or table data. The extension includes information about the file format of the input and output data of the script (for example, csv, jpg, txt, and the like).

Also, the property registration means 5 (control unit 10) (refer to FIG. 1) performs control of registering properties including an input and output type, a use, and an extension to each of the scripts. Specifically, the property registration means 5 (control unit 10) performs the registration of the properties of the scripts when the scripts are registered in the image analysis apparatus 100 (storage unit 30) (at the time of plug-in). The input and output type includes, for example, information about the dimensions of the input and output data of the script. The use includes, for example, information as to whether the input and output data of the script is image data or table data. The extension includes information about the file format of the input and output data of the script (for example, csv, jpg, txt, and the like).

Here, in the present embodiment, the control unit 10 is configured to execute a subsequent script of two scripts combined in series when the properties of the subsequent script match the properties of a preceding script of two scripts. For example, when it is assumed that the type of the output data of the script A is two-dimensional data, the subsequent script is executed when the type of the input data of the subsequent script combined in series with the script A is the two-dimensional data. Further, the control may be performed based on the use or the extension instead of the input and output data type, or the control may be performed based on two or more of the input and output type, the use, and the extension. When the properties of the preceding script and the subsequent script do not match, a warning may be issued when the subsequent script is executed.

Further, in the present embodiment, the control unit 10 is configured to execute a script having properties that match the properties of the preceding script among one or more selected subsequent scripts. For example, when only one of two scripts which are combined in series with the script A and are executed in parallel has the properties that match the properties of the script A, the only one script is executed and other scripts are not executed.

Further, the above-described properties are registered in the image data 410 whose selection is received by the image selection reception means 1 (control unit 10). The script that receives the image data 410 whose selection has been received by the image selection reception means 1 as input data is executed when the properties of the script match those of the image data 410.

Further, each of the plurality of scripts includes information regarding whether the analysis results (output data) are targets of the finishing processing which will be described later. The data 440 that are targets of the finishing processing among the respective analysis results of the scripts in the analysis processing step are temporarily stored (buffered) as targets for the finishing processing and displayed in the column 330. In FIG. 3, the data 440 is shown as a void image for simplification.

In the present embodiment, the script includes a first processing algorithm for executing processing of combining at least two or more analysis results among the respective analysis results of the plurality of scripts selected by the script selection reception means 2 (control unit 10). Specifically, a plurality of analysis results temporarily stored (buffered) as targets for the finishing processing are combined by executing the first processing algorithm.

In the present embodiment, the script includes a second processing algorithm for executing processing of analyzing a variation in two or more analysis results. Specifically, by executing the second processing algorithm, a variation in the plurality of analysis results temporarily stored (buffered) as targets for finishing processing is analyzed.

Further, in the present embodiment, the control unit is configured to be able to execute the first processing algorithm and the second processing algorithm in parallel, and to receive selection one or more of the first processing algorithm and the second processing algorithm. Specifically, on the setting screen of the analysis recipe 300, when the button 341a displayed as "+ Add script" in the upper column 341 in the "Finishing processing" column 340 is selected, a window is displayed in which the first processing algorithm and the second processing algorithm stored in the storage unit 30 can be selected. For example, when both the first processing algorithm and the second processing algorithm are selected, the first processing algorithm and the second processing algorithm are executed in parallel, and the analysis results (data 450 and data 460) corresponding to each of the first processing algorithm and the second processing algorithm are displayed in the lower column 342 in the "Finishing processing" column. It is also possible to select only one of the first processing algorithm and the second processing algorithm. In FIG. 3, each of the data 450 and the data 460 is shown as a void image for simplification.

Analysis Flow

Next, an analysis flow by the control unit 10 of the image analysis apparatus 100 will be described with reference to FIG. 5.

Figure 5:
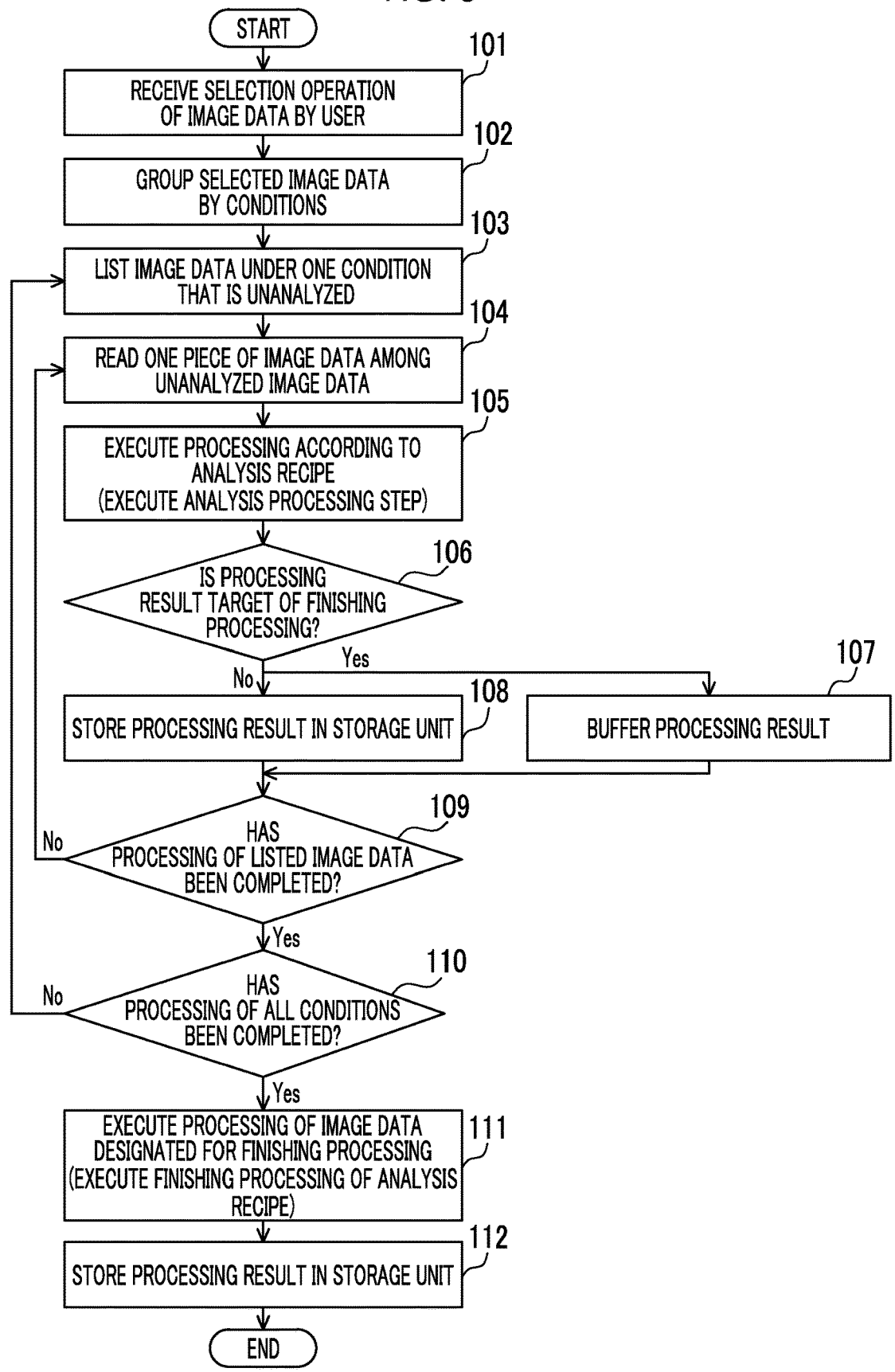
FIG. 5 is a flow diagram showing an analysis flow by a control unit according to the embodiment.

First, as shown in FIG. 5, in step 101, a selection operation of the image data 410 by the user is received. Specifically, on the setting screen of the analysis recipe 300 shown in FIGS. 2 and 3, the button 311a displayed as "Select image" or the button 311b displayed as "Register image" is selected, whereby the image data 410 to be targets of the analysis processing can be selected.

Next, in step 102, the selected image data 410 are grouped by conditions. Specifically, the control unit 10 performs control of dividing the plurality of image data 410 selected in step 101 into a plurality of groups by conditions such as the passage number of the cells, the culture days of the cells, and the like. Each of the plurality of groups includes one or more pieces of image data.

Next, in step 103, the control unit 10 performs control of listing one group of image data 410 for which the analysis processing has not yet been performed among the plurality of groups grouped in step 102.

Next, in step 104, the control unit 10 performs control of reading one piece of image data among the unanalyzed image data 410 listed in step 103.

Next, in step 105, the data analysis means 3 (control unit 10) performs control of executing processing according to the analysis recipe 300 for the one piece of image data 410 read in step 104. An example of the analysis recipe 300 is described later with reference to FIG. 6. In step 105, only the analysis processing step (Step 1, refer to FIG. 3) of the analysis recipe 300 is performed.

Next, in step 106, the control unit 10 determines whether the respective analysis results of the plurality of scripts acquired in step 105 are targets of the finishing processing. Each time each of the plurality of scripts in step 105 is executed, the control unit 10 determines whether the analysis results are targets of the finishing processing. In other words, the control unit 10 determines whether the analysis results are targets of the finishing processing while executing the processing according to the analysis recipe 300. The processing in step 107 is performed for the analysis results determined to be targets of the finishing processing. The processing in step 108 is performed for the analysis results determined not to be targets of the finishing processing. After all of the plurality of scripts in the analysis recipe 300 have been executed, it may be determined whether all the respective analysis results are targets of the finishing processing.

In step 107, the analysis results determined to be targets of the finishing processing in step 106 are temporarily buffered in a cache memory or the like. In step 108, the analysis results determined not to be targets of the finishing processing in step 106 are stored (registered) in the storage unit 30.

Next, in step 109, it is determined whether the processing according to the analysis recipe 300 for all the image data 410 listed in step 103 has been completed. When it is determined that the processing according to the analysis recipe 300 for all the listed image data 410 has been completed, the process proceeds to step 110. When it is determined that the processing according to the analysis recipe 300 for all the listed image data 410 has not been completed, the process returns to step 104.

Next, in step 110, it is determined whether the processing according to the analysis recipe 300 for all the groups grouped by conditions in step 102 has been completed. When it is determined that the processing according to the analysis recipe 300 for all groups has been completed, the process proceeds to step 111. When it is determined that the processing according to the analysis recipe 300 for all groups has not been completed, the process returns to step 103.

Next, in step 111, the finishing processing is performed on the data designated for the finishing processing (buffered in step 107). That is, the finishing processing step (Step 2, refer to FIG. 3) in the analysis recipe 300 is performed. An example of the finishing processing (first processing algorithm and second processing algorithm) will be described later.

In step 112, the analysis results of the finishing processing acquired in step 111 are stored (registered) in the storage unit 30.

Analysis Recipe

Figure 6:
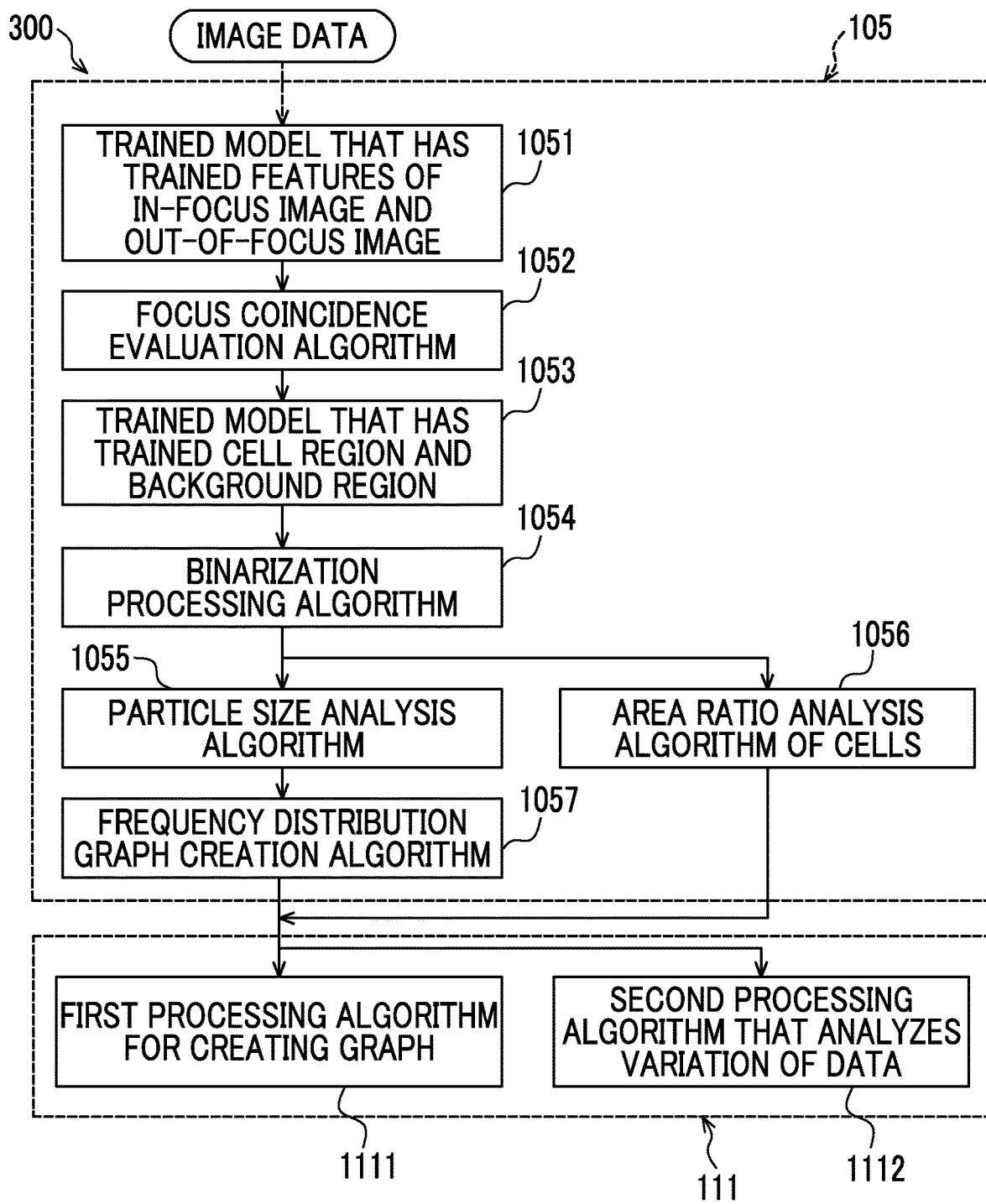
FIG. 6 is a diagram showing an example of the analysis recipe according to the embodiment.

Next, an example of the analysis recipe 300 will be described with reference to FIG. 6. Step 1051 to step 1057 in FIG. 6 are steps included in step 105 in FIG. 5. Step 1111 and step 1112 in FIG. 6 are steps included in step 111 in FIG. 5.

First, as shown in FIG. 6, the control unit 10 applies a trained model that has trained the features of an in-focus image and an out-of-focus image to input image data 410. As a result, the control unit 10 performs control of displaying an image of the cells 400 that are in-focus in the input image data 410 and an image of the cells 400 that are out-of-focus in the input image data 410 by distinguishing them, for example, by color. The image of the cells 400 that are in-focus and the image of the cells 400 that are out-of-focus may be distinguished by a method different from the method described above. Also, image data in which a subject other than the cells 400 is displayed may be used.

Next, in step 1052, a focus coincidence evaluation algorithm is executed using the analysis result (output data) in step 1051 as input data. As a result, in the input data, the ratio of a region where the cells 400 that are in-focus is displayed out of all the regions where the cells 400 are displayed is calculated.

Next, in step 1053, the trained model that has trained a cell region and a background region is applied using the analysis result (output data) in step 1052 as input data. As a result, the cell region and the background region are distinguished in the input data.

Next, in step 1054, a binarization processing algorithm is applied using the analysis result (output data) in step 1053 as input data. As a result, data in which the value of the cell region and the value of the background region in the input data are set to 1 and 0, respectively, is acquired.

Next, a particle size analysis algorithm and an area ratio analysis algorithm are selected as analysis algorithms using the analysis result (output data) in step 1054 as input data. As a result, in step 1055 and step 1056, a particle size analysis algorithm (step 1055) and an area ratio analysis algorithm of the cells 400 (step 1056) are executed in parallel using the analysis result (output data) in step 1054 as input data. The particle size of the cell 400 displayed in the input data is calculated by executing the particle size analysis algorithm in step 1055. The area ratio of the cells 400 displayed in the input data (for example, the area ratio occupied by each of the cells 400 to the total area of the region where the cells 400 are displayed) is calculated by executing the area ratio analysis algorithm of the cells 400 in step 1056.

Next, in step 1057, a frequency distribution graph creation algorithm is executed using the analysis result (output data) in step 1055 as input data. As a result, a graph showing the number of cells 400 by particle sizes is created.

Next, in step 1111, the analysis result (output data) in step 1056 and the analysis result (output data) in step 1057 are used as input data to execute the first processing algorithm for creating a graph. Specifically, when it is assumed that a predetermined graph is created by the processing in step 1056, the graph acquired by the processing in step 1056 and the graph acquired by the processing in step 1057 are integrated with each other by executing the first processing algorithm (combined into one graph). Graphs that correspond to different conditions from each other or graphs of image data 410 different from each other may be integrated by executing the first processing algorithm.

Further, in step 1112, a variation in data that correspond to different conditions or a variation in data of image data 410 different from each other are analyzed by executing the second processing algorithm. The processing contents in step 1111 and step 1112 are examples, and the present disclosure is not limited thereto.

The analysis processing in step 1111 and the analysis processing in step 1112 are executed in parallel.

Effect of Present Embodiment

The image analysis apparatus 100 of the present embodiment can obtain the following effects.

In the present embodiment, as described above, the image analysis apparatus 100 includes the control unit 10 that performs control of executing analysis on the selected image data 410 by the plurality of selected scripts in parallel. As a result, since it is not necessary to individually execute the work of processing for each of the plurality of scripts on one piece of data, it is possible to reduce the labor of the user. Therefore, it is possible to reduce the labor of the user when executing the plurality of scripts. In addition, the work time can be shortened compared to the case of performing the work of individually executing processing for each of the plurality of scripts. The user can compare the respective analysis results of the plurality of selected scripts on the same screen by displaying the respective analysis results of the plurality of selected scripts on the same screen.

In the present embodiment, further effects can be obtained the following configuration.

In the present embodiment, as described above, the control unit 10 is configured to perform control of generating an analysis recipe 300 in which a plurality of analysis steps for analyzing image data 410 are combined in series, and to execute analysis on selected image data 410 by the plurality of selected scripts in parallel in each of the plurality of analysis steps of the generated analysis recipe 300. As a result, since the scripts can be executed in parallel in each of the plurality of analysis steps, the labor of the user can be further reduced.

In addition, in the present embodiment, as described above, the script includes a trained model generated by machine learning for analysis of the image data 410 and an analysis algorithm used to execute analysis on the image data 410. In addition, the control unit 10 is configured to execute analysis on the selected image data 410 by a plurality of selected trained models in parallel, and to execute analysis on the selected image data 410 by a plurality of selected analysis algorithms in parallel. As a result, since the plurality of trained models can be executed in parallel and the plurality of analysis algorithms can be executed in parallel, the labor of the user can be reduced in each of the analysis using the trained models and the analysis using the analysis algorithms.

In the present embodiment, as described above, the control unit 10 is configured to execute another analysis algorithm which is combined in series with one analysis algorithm, using the analysis result obtained by executing one analysis algorithm as input data. As a result, the analysis recipe 300 can be easily extended by combining the analysis algorithms in series. Also, unlike the case where one algorithm and another algorithm are described as one script, one algorithm and another algorithm can be used individually. As a result, each of a variation in the analysis recipe 300 and a variation in processing modules consisting of the plurality of algorithms can be easily increased.

Also, unlike the case where one algorithm and another algorithm are described as one script, the respective analysis results of one algorithm and another algorithm can be individually acquired and confirmed by making one algorithm and another algorithm into separate scripts. As a result, each algorithm can be individually modified when unintended analysis results are obtained. Furthermore, it is possible to easily analyze a variation in data based on the analysis results for each of algorithms, and to easily perform processing of combining each of data.

In addition, since an amount of description of the script is reduced as compared with the case where one algorithm and another algorithm are described as one script, it is possible to reduce the possibility that the configuration of the script is partially similar to the configurations of other scripts. As a result, since it is possible to reduce the possibility that other similar scripts are retrieved, it is possible to facilitate the retrieval of scripts.

In the present embodiment, as described above, the control unit 10 performs control of registering properties including the input and output type, the use, and the extension for each of the scripts, and is configured to execute a subsequent script of two scripts combined in series when the properties of the subsequent script match the properties of a preceding script of two scripts. As a result, since it is possible to prevent the execution of the subsequent script having properties different from those of the preceding script, it is possible to suppress the generation of analysis results in which inconsistency occurs by the subsequent script. Since the user can select the subsequent script based on the properties of the preceding script, the subsequent script can be easily selected.

In the present embodiment, as described above, the control unit 10 is configured to execute a script having properties that match the properties of the preceding script among one or more selected subsequent scripts. As a result, since one or more selected subsequent scripts that do not match the properties of the preceding script are not executed, it is possible to prevent an increase in a control load of the control unit 10 due to execution of a script that does not match the properties of the preceding script.

Further, in the present embodiment, as described above, the script includes a first processing algorithm for executing processing of combining at least two or more analysis results among the respective analysis results of the plurality of selected scripts. As a result, one analysis result can be generated based on two or more analysis results by the first processing algorithm. As a result, the user can easily grasp the correlation of two or more analysis results based on the one analysis result that has been combined.

In the present embodiment, as described above, the script further includes a second processing algorithm for executing processing of analyzing a variation in two or more analysis results. As a result, the user can easily grasp the correlation of two or more analysis results based on the processing results of the second processing algorithm.

In the present embodiment, as described above, the control unit 10 is configured to execute the first processing algorithm and the second processing algorithm in parallel. As a result, since the first processing algorithm and the second processing algorithm can be executed in parallel, the labor of the user can be reduced as compared with the case where the processing of combining two or more analysis results and the analysis of a variation in two or more analysis results are individually performed.

In the present embodiment, as described above, the data analysis method includes a step of executing analysis on the selected image data 410 by the plurality of selected scripts in parallel. As a result, the plurality of scripts can be executed on one piece of data in parallel. As a result, since it is not necessary to individually execute the work of processing for each of the plurality of scripts on one piece of data, it is possible to provide an image analysis method that can reduce the labor of the user.

Modification Example

It needs to consider that the embodiments disclosed herein are examples in all respects and are not considered to be restrictive. The scope of the present invention is shown by the claims, not the description of the above embodiment, and further includes all changes (modification examples) within the meaning and the scope equivalent to the scope of claims.

Figure 7:
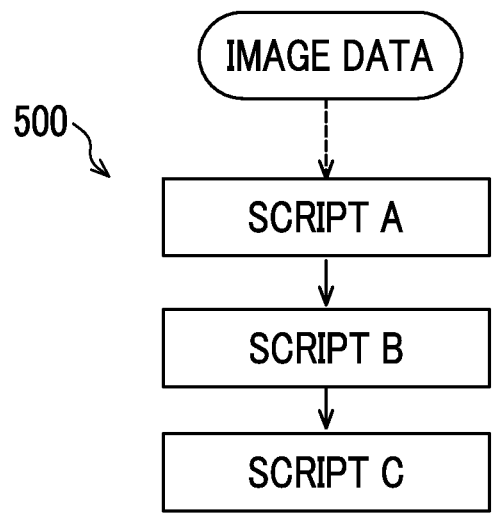
FIG. 7 is a diagram showing an example of the analysis recipe according to a first modification example of the embodiment.
Figure 8:
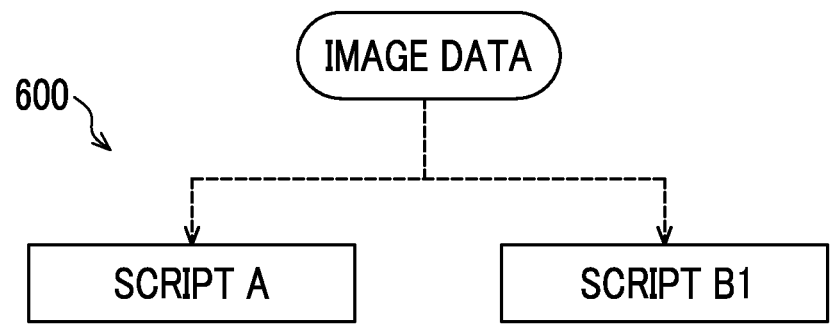
FIG. 8 is a diagram showing an example of the analysis recipe according to a second modification example of the embodiment.

For example, in the above-described embodiment, an example of the analysis recipe 300 in which the plurality of scripts are combined in series and in parallel is shown, but the present invention is not limited thereto. For example, an analysis recipe 500 (refer to FIG. 7) in which the plurality of scripts are combined only in series may be generated, or an analysis recipe 600 (refer to FIG. 8) in which the plurality of scripts are combined only in parallel may be generated.

In the present embodiment, as described above, an example in which analysis algorithms are combined in series and in parallel is shown, but the present invention is not limited thereto. Analysis modules consisting of the plurality of analysis algorithms may be combined in series and in parallel, or the analysis modules and the analysis algorithms (trained models) may be combined in series and in parallel.

In the above-described embodiment, an example in which the analysis recipe 300 includes both a trained model and an analysis algorithm is shown, but the present invention is not limited thereto. For example, the analysis recipe may not include either the trained model or the analysis algorithm. Also, the analysis recipe may not include the finishing processing.

In the above-described embodiment, an example in which an analysis processing step is provided that can select both a trained model and an analysis algorithm is shown, but the present invention is not limited thereto. A step in which only the trained model can be selected and a step in which only the analysis algorithm can be selected may be combined in series with each other.

In the above-described embodiment, an example in which the script includes a first processing algorithm and a second processing algorithm as algorithms for finishing processing, but the present invention is not limited thereto. The script may include a processing algorithm for executing processing on two or more processing results other than the first processing algorithm and the second processing algorithm as an algorithm for finishing processing.

In the above-described embodiment, the image analysis apparatus 100 that analyzes the image data 410 is shown as an example of the data analysis apparatus, but the present invention is not limited thereto. The data analysis apparatus may be an analysis apparatus that analyzes analysis data other than image data (for example, analysis results of gas chromatography, and the like).

Item 1

A data analysis apparatus including:
a control unit configured to perform
control of receiving an operation to select analysis data acquired by an analysis device,
control of receiving an operation to select a plurality of scripts that execute analysis on the selected analysis data, and
control of executing analysis on the selected analysis data by the plurality of selected scripts in parallel; and
a display unit configured to display analysis results acquired by analyzing the analysis data by the control unit on the same screen.

Item 2

The data analysis apparatus according to Item 1, in which the control unit is configured to perform control of generating an analysis flow in which a plurality of analysis steps for executing analysis on the analysis data are combined in series, and to execute analysis on the selected analysis data by the plurality of selected scripts in parallel in each of the plurality of analysis steps in the generated analysis flow.

Item 3

The data analysis apparatus according to Item 1 or 2, in which the script includes a trained model generated by machine learning for analyzing the analysis data, and an analysis algorithm used for executing analysis on the analysis data, and
the control unit is configured to execute analysis on the selected analysis data by a plurality of selected trained models in parallel, and to execute analysis on the selected analysis data by a plurality of selected analysis algorithms in parallel.

Item 4

The data analysis apparatus according to any one of Items 1 to 3, in which the script includes a trained model generated by machine learning for analyzing the analysis data, and an analysis algorithm used for executing analysis on the analysis data, and
the control unit is configured to execute another analysis algorithm combined in series with one analysis algorithm by using the analysis result obtained by executing the one analysis algorithm as input data.

Item 5

The data analysis apparatus according to any one of Items 1 to 4, in which the control unit is configured to perform control of registering properties including an input and output type, a use, and an extension to each of the scripts, and to execute a subsequent script of two scripts combined in series when the properties of the subsequent script match the properties of a preceding script of two scripts.

Item 6

The data analysis apparatus according to Item 5, in which the control unit is configured to execute the script having properties that match the properties of the preceding script among one or more selected subsequent scripts.

Item 7

The data analysis apparatus according to any one of Items 1 to 6, in which the script includes a first processing algorithm for executing processing of combining at least two or more analysis results among the respective analysis results of the plurality of selected scripts.

Item 8

The data analysis apparatus according to Item 7, in which the script further includes a second processing algorithm for executing processing of analyzing a variation in two or more analysis results.

Item 9

The data analysis apparatus according to Item 8, in which the control unit is configured to execute the first processing algorithm and the second processing algorithm in parallel.

Item 10

A data analysis method including:
- a step of receiving a selection of analysis data acquired by an analysis device;
- a step of selecting a plurality of scripts that execute analysis on the analysis data; and
- a step of executing analysis on the selected analysis data by the plurality of selected scripts in parallel.

What is claimed is:

1. A data analysis apparatus comprising:
a control unit configured to:
   receive an operation to select analysis data acquired by an analysis device,
   receive an operation to select a plurality of machine learning models that execute analysis on the selected analysis data, and
   execute analysis on the selected analysis data by the plurality of selected machine learning models in parallel; and
a display unit configured to display analysis results acquired by analyzing the analysis data by the control unit on a same screen,
wherein the control unit is further configured to perform a finishing process by a first processing algorithm and a second processing algorithm analyzing the analysis results after performing the analysis in parallel by the plurality of selected machine learning models.

2. The data analysis apparatus according to claim 1, wherein the control unit is configured to generate an analysis flow in which a plurality of analysis steps for executing analysis on the analysis data are combined in series, and to execute analysis on the selected analysis data by the plurality of selected machine learning models in parallel in each of the plurality of analysis steps in the generated analysis flow.

3. The data analysis apparatus according to claim 1, wherein the plurality of machine learning models includes a trained model generated by machine learning for analyzing the analysis data, and an analysis algorithm used for executing analysis on the analysis data, and the control unit is configured to execute analysis on the selected analysis data by a plurality of selected trained models in parallel, and to execute analysis on the selected analysis data by a plurality of selected analysis algorithms in parallel.

4. The data analysis apparatus according to claim 1, wherein the plurality of machine learning models includes a trained model generated by machine learning for analyzing the analysis data, and an analysis algorithm used for executing analysis on the analysis data, and the control unit is configured to execute another analysis algorithm combined in series with one analysis algorithm by using the analysis result obtained by executing the one analysis algorithm as input data.

5. The data analysis apparatus according to claim 1, wherein the control unit is configured to register properties including an input and output type, a use, and an extension to each of the plurality of machine learning models, and to execute a subsequent machine learning model of two machine learning models combined in series when the properties of the subsequent machine learning model match the properties of a preceding machine learning model of two machine learning models.

6. The data analysis apparatus according to claim 5, wherein the control unit is configured to execute the machine learning model having properties that match the properties of the preceding machine learning model among one or more selected subsequent machine learning models.

7. The data analysis apparatus according to claim 1, wherein the plurality of machine learning models includes the first processing algorithm for executing processing of combining at least two or more analysis results among the respective analysis results of the plurality of selected machine learning models.

8. The data analysis apparatus according to claim 7, wherein the plurality of machine learning models further includes the second processing algorithm for executing processing of analyzing a variation in two or more analysis results.

9. The data analysis apparatus according to claim 8, wherein the control unit is configured to execute the first processing algorithm and the second processing algorithm in parallel.

10. A data analysis method comprising:
receiving a selection of analysis data acquired by an analysis device;
selecting a plurality of machine learning models that execute analysis on the analysis data;
executing analysis on the selected analysis data by the plurality of selected machine learning models in parallel; and
performing a finishing process by a first processing algorithm and a second processing algorithm analyzing analysis results after performing the analysis in parallel by the plurality of selected machine learning models.

* * * * *